US012120480B2

(12) United States Patent
Arakawa

(10) Patent No.: US 12,120,480 B2
(45) Date of Patent: Oct. 15, 2024

(54) INFORMATION PROCESSING DEVICE, WEARABLE DEVICE, INFORMATION PROCESSING METHOD, AND STORAGE MEDIUM

(71) Applicant: NEC Corporation, Tokyo (JP)

(72) Inventor: Takayuki Arakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/389,270

(22) Filed: Nov. 14, 2023

(65) Prior Publication Data

US 2024/0080605 A1 Mar. 7, 2024

Related U.S. Application Data

(63) Continuation of application No. 17/312,458, filed as application No. PCT/JP2018/046878 on Dec. 19, 2018, now Pat. No. 11,895,455.

(51) Int. Cl.
*H04R 1/10* (2006.01)
*G10L 25/51* (2013.01)

(52) U.S. Cl.
CPC ............ *H04R 1/1041* (2013.01); *G10L 25/51* (2013.01)

(58) Field of Classification Search
CPC .............................. H04R 1/1041; G10L 25/51
See application file for complete search history.

(56) References Cited

U.S. PATENT DOCUMENTS

| | | | | |
|---|---|---|---|---|
| 2009/0154720 | A1 | 6/2009 | Oki | |
| 2009/0208027 | A1 | 8/2009 | Fukuda et al. | |
| 2010/0142720 | A1 | 6/2010 | Kon | |
| 2010/0177910 | A1 | 7/2010 | Watanabe | |
| 2010/0189269 | A1 | 7/2010 | Haartsen et al. | |
| 2013/0183939 | A1 | 7/2013 | Kakehi | |
| 2014/0037101 | A1 | 2/2014 | Murata et al. | |
| 2017/0347180 | A1* | 11/2017 | Petrank | G06F 3/165 |
| 2018/0121156 | A1 | 5/2018 | Zhen et al. | |
| 2019/0012444 | A1* | 1/2019 | Lesso | G06F 3/165 |
| 2019/0012448 | A1* | 1/2019 | Lesso | H04W 12/06 |
| 2022/0053257 | A1 | 2/2022 | Arakawa | |

FOREIGN PATENT DOCUMENTS

| | | | |
|---|---|---|---|
| CN | 101682811 | A | 3/2010 |
| CN | 101765035 | A | 6/2010 |
| CN | 106162489 | A | 11/2016 |
| EP | 3270610 | A1 | 1/2018 |
| GB | 2499781 | A | 9/2013 |
| JP | 2004-065363 | A | 3/2004 |

(Continued)

OTHER PUBLICATIONS

International Search Report of PCT Application No. PCT/JP2018/046878 mailed on Mar. 19, 2019.

(Continued)

*Primary Examiner* — Simon King
(74) *Attorney, Agent, or Firm* — Sughrue Mion, PLLC

(57) ABSTRACT

Provided is an information processing device including an acoustic information acquisition unit configured to acquire an acoustic information about a resonance in a body of a user wearing a wearable device and a wearing determination unit configured to determine whether or not the user wears the wearable device based on the acoustic information.

17 Claims, 15 Drawing Sheets

(56) References Cited

FOREIGN PATENT DOCUMENTS

| | | | |
|---|---|---|---|
| JP | 2004-153350 | A | 5/2004 |
| JP | 2007165940 | A | 6/2007 |
| JP | 2008-028953 | A | 2/2008 |
| JP | 2009152666 | A | 7/2009 |
| JP | 2009207053 | A | 9/2009 |
| JP | 2009232423 | A | 10/2009 |
| JP | 2010136035 | A | 6/2010 |
| JP | 2010154563 | A | 7/2010 |
| JP | 2012516090 | A | 7/2012 |
| JP | 2014033303 | A | 2/2014 |
| JP | 2014187413 | A | 10/2014 |
| JP | 2016006925 | A | 1/2016 |
| JP | 5907068 | B2 | 4/2016 |
| JP | 2018-512813 | A | 5/2018 |
| JP | 7300091 | B2 | 6/2023 |
| WO | 2009125567 | A1 | 10/2009 |
| WO | 2014010165 | A1 | 1/2014 |
| WO | 2014061578 | A1 | 4/2014 |

OTHER PUBLICATIONS

English translation of Written opinion for PCT Application No. PCT/JP2018/046878 mailed on Mar. 19, 2019.

Extended European Search Report for EP Application No. 18943699.1 dated on Dec. 10, 2021.

JP Office Action for JP Application No. 2020-560711, mailed on Nov. 22, 2022 with English Translation.

JP Office Communication for JP Application No. 2020-560711, mailed on May 18, 2023 with English Translation.

CN Office Action for Chinese Patent Application No. 201880100711.2, mailed on Oct. 31, 2023 with English Translation.

JP Office Action for JP Application No. 2023-093702, mailed on Aug. 8, 2024 with English Translation.

* cited by examiner

FIG. 11

| TYPES OF ACOUSTIC SIGNALS | NON-WEARING STATE | WEARING STATE |
| --- | --- | --- |
| BIOLOGICAL SOUND (EQUAL TO OR LESS THAN 1 kHz) | LESS THAN THRESHOLD | EQUAL TO OR GREATER THAN THRESHOLD |
| VOCAL TRACT ECHO SOUND (AROUND 2 kHz) | WITHOUT PEAK | WITH PEAK |
| EAR CANAL ECHO SOUND (AROUND 5 – 20 kHz) | WITHOUT PEAK | WITH PEAK |

INFORMATION PROCESSING DEVICE, WEARABLE DEVICE, INFORMATION PROCESSING METHOD, AND STORAGE MEDIUM

This application is a Continuation of U.S. application Ser. No. 17/312,458 filed on Jun. 10, 2021, which is a National Stage Entry of PCT/JP2018/046878 filed on Dec. 19, 2018, the contents of all of which are incorporated herein by reference, in their entirety.

TECHNICAL FIELD

The disclosure relates to an information processing device, a wearable device, an information processing method, and a storage medium.

BACKGROUND ART

Patent Literature 1 discloses a headphone device having an outer microphone and an inner microphone. The headphone device can detect whether the headphone device is in a wearing state or a non-wearing state by comparing a voice signal of an external sound obtained by the outer microphone with a voice signal of an external sound obtained by the inner microphone.

Patent Literature 2 discloses a headset having a detection microphone and a speaker. The headset compares an acoustic signal such as music input to the headset with an acoustic detection signal detected by a detection microphone, and determines that the headset is in a non-wearing state when the signals do not match each other.

CITATION LIST

[Patent Literature]

PTL 1: Japanese Patent Application Laid-open No. 2014-33303

PTL 2: Japanese Patent Application Laid-open No. 2007-165940

SUMMARY OF INVENTION

Technical Problem

The headphone device in Patent Literature 1 detects a wearing state using an external sound. Since the external sound may change depending on the external environment, there is a possibility that the accuracy of the wearing determination cannot be sufficiently obtained depending on the external environment. The headset in Patent Literature 2 detects the wearing state based on the match or mismatch between an input acoustic signal and a detected acoustic detection signal. Therefore, when the headset is sealed, for example, when the headset is in a case, the acoustic signal and the acoustic detection signal may match even when the headset is in a non-wearing state. Thus, the accuracy of the wearing determination may not be sufficiently obtained depending on the environment where the headset is placed.

The example embodiments intend to provide an information processing device, a wearable device, an information processing method, and a storage medium which can perform the wearing determination of the wearable device in a wide range of environments.

Solution to Problem

According to one example aspect of the example embodiments, provided is an information processing device including an acoustic information acquisition unit configured to acquire an acoustic information about a resonance in a body of a user wearing a wearable device and a wearing determination unit configured to determine whether or not the user wears the wearable device based on the acoustic information.

According to another example aspect of the example embodiments, provided is a wearable device including an acoustic information acquisition unit configured to acquire an acoustic information about a resonance in a body of a user wearing the wearable device and a wearing determination unit configured to determine whether or not the user wears the wearable device based on the acoustic information.

According to another example aspect of the example embodiments, provided is an information processing method including acquiring an acoustic information about a resonance in a body of a user wearing a wearable device and determining whether or not the user wears the wearable device based on the acoustic information.

According to another example aspect of the example embodiments, provided is a storage medium storing a program that causes a computer to perform acquiring an acoustic information about a resonance in a body of a user wearing a wearable device and determining whether or not the user wears the wearable device based on the acoustic information.

Advantageous Effects of Invention

According to the example embodiments, an information processing device, a wearable device, an information processing method, and a storage medium which can perform the wearing determination of the wearable device in a wide range of environments can be provided.

BRIEF DESCRIPTION OF DRAWINGS

FIG. 11 is a table showing types and determination criteria of acoustic signals used in a wearing determination.

DESCRIPTION OF EMBODIMENTS

Example embodiments will be described below with reference to the drawings. Throughout the drawings, the same components or corresponding components are labeled with same references, and the description thereof may be omitted or simplified.

First Example Embodiment

An information processing system according to the example embodiment will be described. The information processing system of the example embodiment is a system for detecting a wearing of a wearable device such as an earphone.

Figure 1:
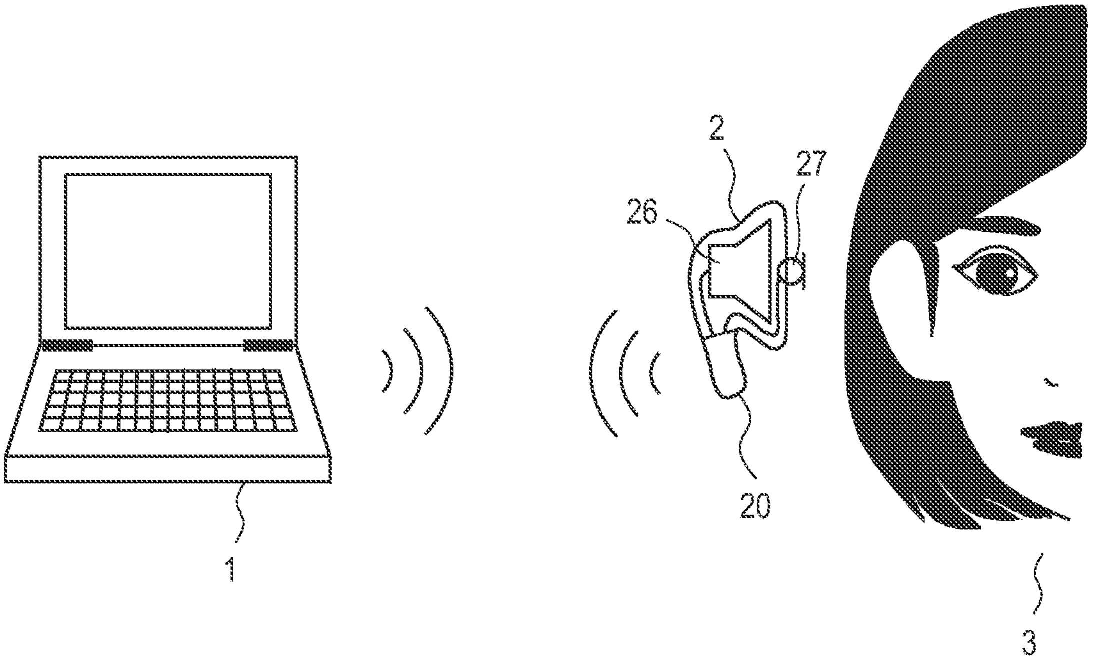
FIG. 1 is a schematic diagram illustrating a general configuration of an information processing system according to a first example embodiment.

FIG. 1 is a schematic diagram illustrating a general configuration of an information processing system according to the example embodiment. The information processing system is provided with an information communication device 1 and an earphone 2 which may be connected to each other by wireless communication.

The earphone 2 includes an earphone control device 20, a speaker 26, and a microphone 27. The earphone 2 is an acoustic device which can be worn on the ear of the user 3, and is typically a wireless earphone, a wireless headset or the like. The speaker 26 functions as a sound wave generation unit which emits a sound wave toward the ear canal of the user 3 when worn, and is arranged on the wearing surface side of the earphone 2. The microphone 27 is also arranged on the wearing surface side of the earphone 2 so as to receive sound waves reflected by the ear canal or the like of the user 3 when worn. The earphone control device 20 controls the speaker 26 and the microphone 27 and communicates with an information communication device 1.

Note that, in the specification, "sound" such as sound waves and voices includes inaudible sounds whose frequency or sound pressure level is outside the audible range.

The information communication device 1 is, for example, a computer, and controls the operation of the earphone 2, transmits audio data for generating sound waves emitted from the earphone 2, and receives audio data acquired from the sound waves received by the earphone 2. As a specific example, when the user 3 listens to music using the earphone 2, the information communication device 1 transmits compressed data of music to the earphone 2. When the earphone 2 is a telephone device for business command at an event site, a hospital or the like, the information communication device 1 transmits audio data of the business instruction to the earphone 2. In this case, the audio data of the utterance of the user 3 may be transmitted from the earphone 2 to the information communication device 1. The information communication device 1 or the earphone 2 may have a function of otoacoustic authentication using sound waves received by the earphone 2.

Note that, the general configuration is an example, and for example, the information communication device 1 and the earphone 2 may be connected by wire. Further, the information communication device 1 and the earphone 2 may be configured as an integrated device, and further another device may be included in the information processing system.

Figure 2:
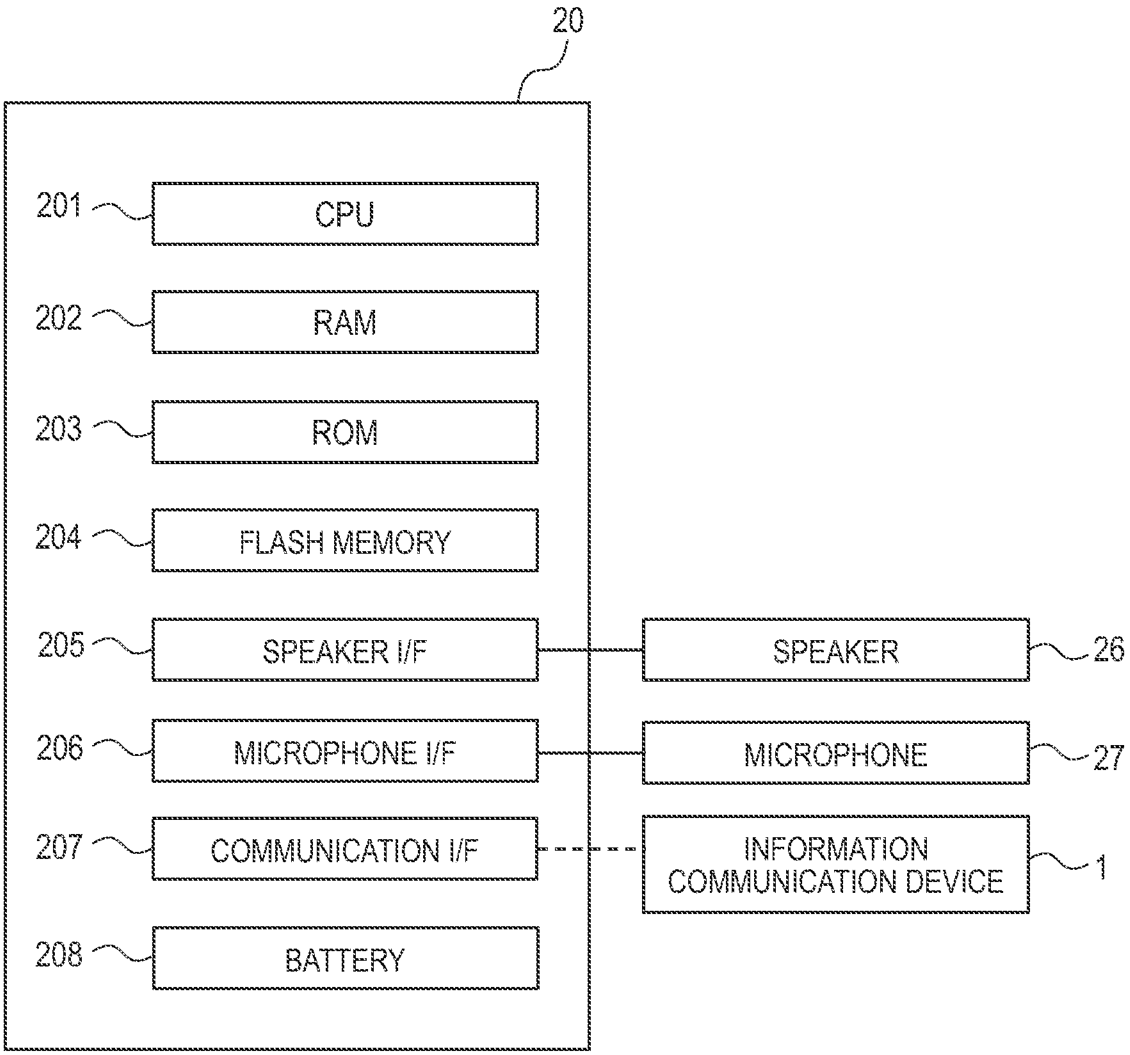
FIG. 2 is a block diagram illustrating a hardware configuration of an earphone according to the first example embodiment.

FIG. 2 is a block diagram illustrating a hardware configuration example of the earphone control device 20. The earphone control device 20 includes a central processing unit (CPU) 201, a random access memory (RAM) 202, a read only memory (ROM) 203, and a flash memory 204. The earphone control device 20 also includes a speaker interface (I/F) 205, a microphone I/F 206, a communication I/F 207, and a battery 208. Note that, each unit of the earphone control device 20 are connected to each other via a bus, wiring, a driving device, or the like (not shown).

The CPU 201 is a processor that has a function of performing a predetermined calculation according to a program stored in the ROM 203, the flash memory 204, or the like, and also controlling each unit of the earphone control device 20. The RAM 202 is composed of a volatile storage medium and provides a temporary memory area required for the operation of the CPU 201. The ROM 203 is composed of a non-volatile storage medium and stores necessary information such as a program used for the operation of the earphone control device 20. The flash memory 204 is a storage device composed of a non-volatile storage medium and temporarily storing data, storing an operation program of the earphone control device 20, or the like.

The communication I/F 207 is a communication interface based on standards such as Bluetooth (registered trademark) and Wi-Fi (registered trademark), and is a module for performing communication with the information communication device 1.

The speaker I/F 205 is an interface for driving the speaker 26. The speaker I/F 205 includes a digital-to-analog conversion circuit, an amplifier, or the like. The speaker I/F 205 converts the audio data into an analog signal and supplies the analog signal to the speaker 26. Thus, the speaker 26 emits sound waves based on the audio data.

The microphone I/F 206 is an interface for acquiring a signal from the microphone 27. The microphone I/F 206 includes an analog-to-digital conversion circuit, an amplifier, or the like. The microphone I/F 206 converts an analog signal generated by a sound wave received by the microphone 27 into a digital signal. Thus, the earphone control device 20 acquires audio data based on the received sound waves.

The battery 208 is, for example, a secondary battery, and supplies electric power required for the operation of the earphone 2. Thus, the earphone 2 can operate wirelessly without being connected to an external power source by wire.

Note that the hardware configuration illustrated in FIG. 2 is an example, and devices other than these may be added or some devices may not be provided. Further, some devices may be replaced with another device having similar functions. For example, the earphone 2 may further be provided with an input device such as a button so as to be able to receive an operation by the user 3, and further provided with a display device such as a display or a display lamp for providing information to the user 3. Thus, the hardware configuration illustrated in FIG. 2 can be appropriately changed.

Figure 3:
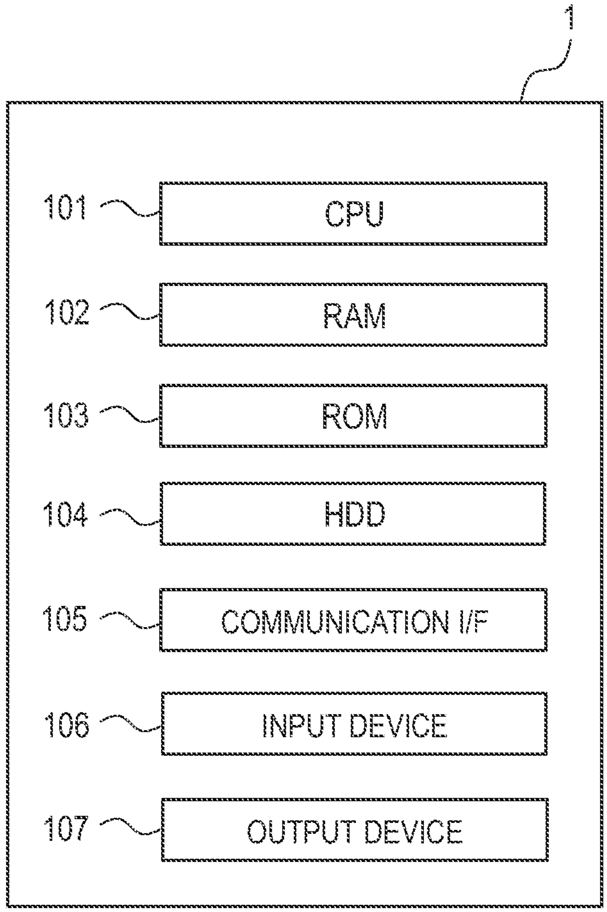
FIG. 3 is a block diagram illustrating a hardware configuration of an information communication device according to the first example embodiment.

FIG. 3 is a block diagram illustrating a hardware configuration example of the information communication device 1. The information communication device 1 includes a CPU 101, a RAM 102, a ROM 103, and a hard disk drive (HDD) 104. The information communication device 1 also includes a communication I/F 105, an input device 106, and an output device 107. Note that, each unit of the information communication device 1 is connected to each other via a bus, wiring, a driving device, or the like (not shown).

In FIG. 3, each unit constituting the information communication device 1 is illustrated as an integrated device, but some of these functions may be provided by an external device. For example, the input device 106 and the output device 107 may be external devices other than the unit constituting functions of a computer including the CPU 101 or the like.

The CPU 101 is a processor that has a function of performing a predetermined calculation according to a program stored in the ROM 103, the HDD 104, or the like, and also controlling each unit of the information communication device 1. The RAM 102 is composed of a volatile storage medium and provides a temporary memory area required for the operation of the CPU 101. The ROM 103 is composed of a non-volatile storage medium and stores necessary information such as a program used for the operation of the information communication device 1. The HDD 104 is a storage device composed of a non-volatile storage medium and temporarily storing data sent to and received from the earphone 2, storing an operation program of the information communication device 1, or the like.

The communication I/F 105 is a communication interface based on standards such as Bluetooth (registered trademark) and Wi-Fi (registered trademark), and is a module for performing communication with the other devices such as the earphone 2.

The input device 106 is a keyboard, a pointing device, or the like, and is used by the user 3 to operate the information communication device 1. Examples of the pointing device include a mouse, a trackball, a touch panel, and a pen tablet.

The output device 107 is, for example, a display device. The display device is a liquid crystal display, an organic light emitting diode (OLED) display, or the like, and is used for displaying information, graphical user interface (GUI) for operation input, or the like. The input device 106 and the output device 107 may be integrally formed as a touch panel.

Note that, the hardware configuration illustrated in FIG. 3 is an example, and devices other than these may be added or some devices may not be provided. Further, some devices may be replaced with other devices having similar functions. Further, some of the functions of the example embodiment may be provided by another device via a network, or the functions of the example embodiment may be realized by being distributed to a plurality of devices. For example, the HDD 104 may be replaced with a solid state drive (SSD) using a semiconductor memory, or may be replaced with a cloud storage. Thus, the hardware configuration illustrated in FIG. 3 can be appropriately changed.

Figure 4:
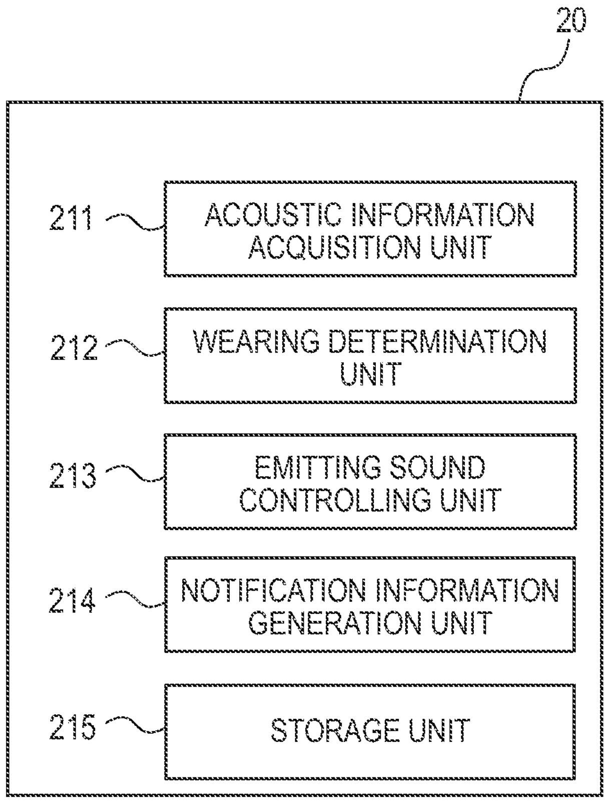
FIG. 4 is a functional block diagram of an earphone control device according to the first example embodiment.

FIG. 4 is a functional block diagram of the earphone control device 20 according to the example embodiment. The earphone control device 20 includes an acoustic information acquisition unit 211, a wearing determination unit 212, an emitting sound controlling unit 213, a notification information generation unit 214 and a storage unit 215.

The CPU 201 loads programs stored in the ROM 203, the flash memory 204, or the like into the RAM 202 and executes them. Thus, the CPU 201 realizes the functions of the acoustic information acquisition unit 211, the wearing determination unit 212, the emitting sound controlling unit 213, and the notification information generation unit 214. Further, the CPU 201 controls the flash memory 204 based on the program to realize the function of the storage unit 215. The specific process performed in each of these units will be described later.

Note that, some or all of the functions of the functional blocks of FIG. 4 may be provided in the information communication device 1 instead of the earphone control device 20. That is, each function described above may be realized by the earphone control device 20, may be realized by the information communication device 1, or may be realized by cooperation between the information communication device 1 and the earphone control device 20. The information communication device 1 and the earphone control device 20 are sometimes generally referred to as information processing devices.

However, it is desirable that the wearing determination process of the example embodiment be performed by the earphone control device 20 provided in the earphone 2. In this case, the communication between the information communication device 1 and the earphone 2 in the wearing determination process can be made unnecessary, and the power consumption of the earphone 2 can be reduced. Since the earphone 2 is a wearing type device, it is required to be small in size. Therefore, the size of the battery 208 is limited, and it is difficult to use a battery having a large discharge capacity. Under such circumstances, it is effective to reduce power consumption by completing the wearing determination process in the earphone 2. In the following description, each function of the function block of FIG. 4 is assumed to be provided in the earphone 2 unless otherwise noted.

Figure 5:
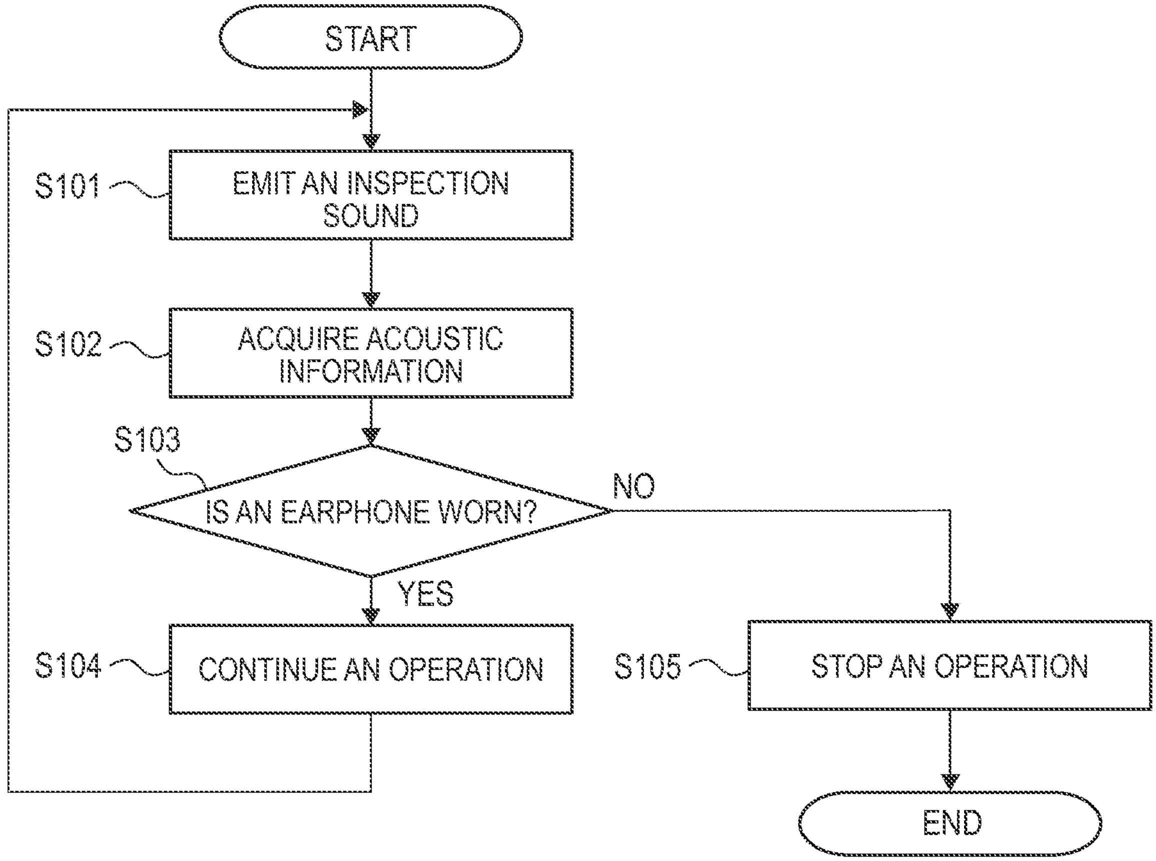
FIG. 5 is a flowchart illustrating a wearing determination process performed by the earphone control device according to the first example embodiment.

FIG. 5 is a flowchart illustrating wearing determination process performed by the earphone control device 20 according to the example embodiment. The operation of the earphone control device 20 will be described with reference to FIG. 5.

The wearing determination process in FIG. 5 is performed, for example, every time a predetermined time elapses when the power of the earphone 2 is on. Alternatively, the wearing determination process in FIG. 5 may be performed when the user 3 starts using the earphone 2 by operating the earphone 2.

In step S101, the emitting sound controlling unit 213 generates an inspection signal and transmits the inspection signal to the speaker 26 via the speaker I/F 205. Thus, the speaker 26 emits an inspection sound for wearing determination toward the ear canal of the user 3.

Note that, in step S101, instead of the method using the inspection sound from the speaker 26, a sound generated in the body of the user 3 may be used. As a specific example of the sound generated in the body, a biological sound generated by the respiration, heartbeat, movement of the muscle or the like of the user 3 can be mentioned. As another example, the voice of the user 3 emitted from the vocal cords of the user 3 by urging the user 3 to make a voice may be used.

An example of processing for urging the user 3 to make a voice will be described. A notification information generation unit 214 generates notification information to urge a user 3 to make a voice. The notification information is, for example, voice information, and may urge the user 3 to make a voice by emitting a message such as "Please speak." from the speaker 26. If the information communication device 1 or the earphone 2 has a display device that the user 3 can watch, the above message may be displayed on the display device.

Further, the processing for emitting the inspection sound or the processing for urging to make a voice may be performed at all times in the wearing determination, or may be performed only when the predetermined condition is satisfied or when the predetermined condition is not satisfied. As an example of this predetermined condition, there is a case in which the sound pressure level included in the acquired acoustic information is not sufficient to make a determination. When this condition is satisfied, an utterance is urged to acquire acoustic information of high sound pressure level. Thus, the accuracy of the wearing determination can be improved.

In step S102, the acoustic information acquisition unit 211 acquires acoustic information based on the sound waves received by the microphone 27. The acoustic information is stored in a storage unit 215 as acoustic information about resonance in the body of the user 3. The acoustic information acquisition unit 211 may appropriately perform signal processing such as Fourier transformation, correlation calculation, noise removal, and level correction when acquiring acoustic information.

In step S103, the wearing determination unit 212 determines whether or not the user 3 wears the earphone 2 based on the acoustic information. If it is determined that the user 3 wears the earphone 2 (YES in step S103), the process proceeds to step S104. If it is determined that the user 3 does not wear the earphone 2 (NO in step S103), the process proceeds to step S105.

In step S104, the earphone 2 continues operations such as communication with the information communication device 1 and generation of sound waves based on information acquired from the information communication device 1. After the lapse of the predetermined time, the process returns to step S101, and the wearing determination is performed again.

In step S105, the earphone 2 stops operations such as communication with the information communication device 1 and generation of sound waves based on information acquired from the information communication device 1, and ends the process.

Thus, when the user 3 wears the earphone 2, the operation is continued, and when not, the operation of the earphone 2 is stopped. Therefore, the waste of power is suppressed due to the operation of the earphone 2 at the time of non-wearing.

In FIG. 5, it is assumed that the process ends after step S105, and the earphone 2 does not operate, but this is an example. For example, after the lapse of the predetermined time, the process may be returned to step S101, and the wearing determination may be performed again, and the operation of the earphone 2 may be restarted when it is determined that the user 3 wears the earphone 2.

A specific example of the inspection sound emitted by the speaker 26 in step S101 will be described. As an example of the signal used for generating the inspection sound, a signal including a predetermined range of frequency components such as a chirp signal, a maximum length sequence (M-sequence) signal, or white noise may be used. Thus, the frequency range of the inspection sound can be used for the wearing determination.

Figure 6:
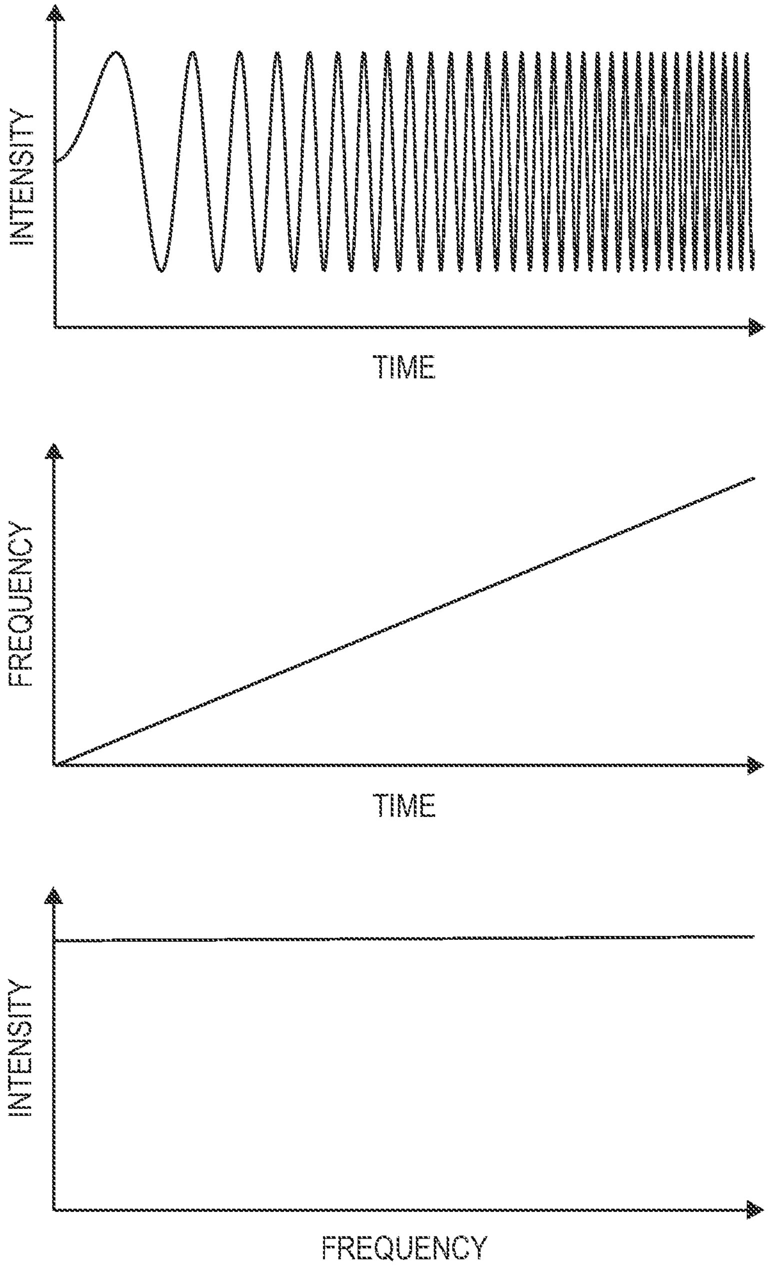
FIG. 6 is a graph showing a characteristic of a chirp signal.

FIG. 6 is a graph showing characteristics of the chirp signal. FIG. 6 shows the relationship between intensity and time, the relationship between frequency and time, and the relationship between intensity and frequency, respectively. A chirp signal is a signal whose frequency continuously changes with time. FIG. 6 shows an example of a chirp signal in which the frequency increases linearly with time.

Figure 7:
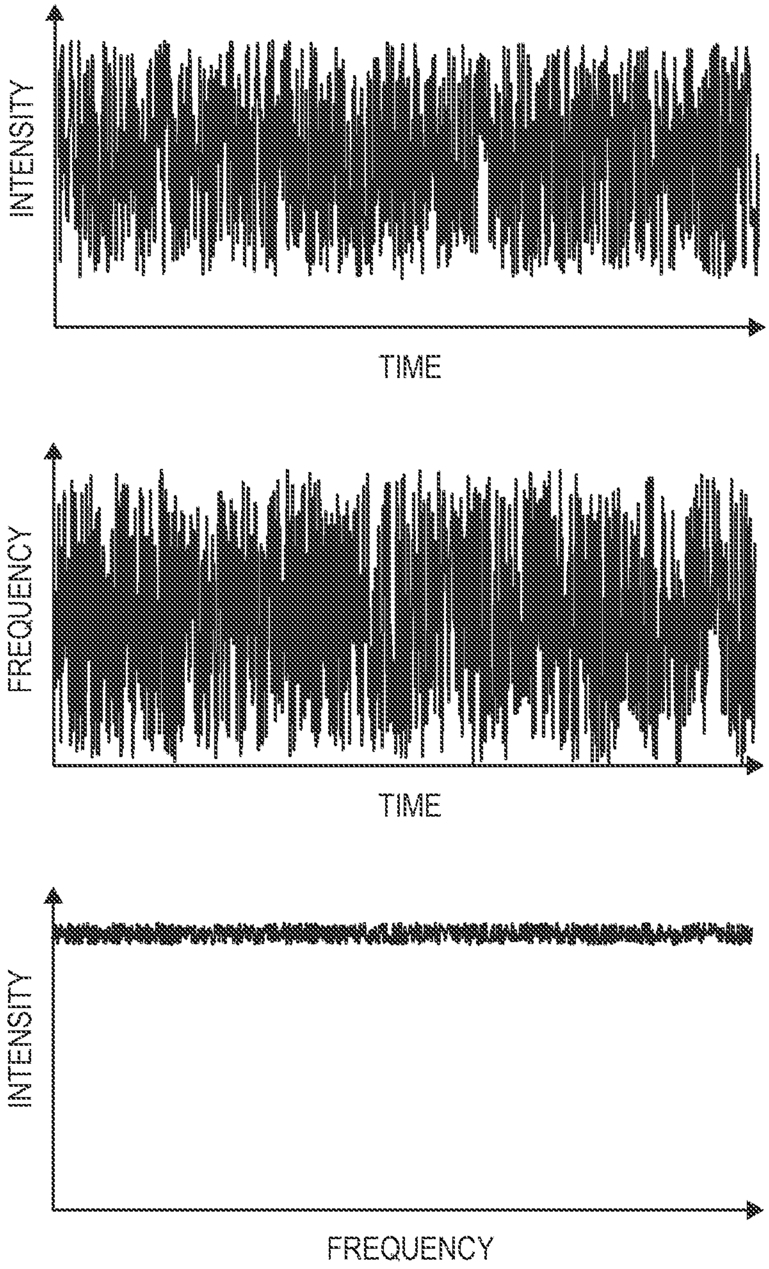
FIG. 7 is a graph showing a characteristic of a M-sequence signal or a white noise.

FIG. 7 is a graph showing characteristics of an M-sequence signal or white noise. Since the M-sequence signal generates a pseudo noise close to white noise, the characteristics of the M-sequence signal and the white noise are substantially the same. FIG. 7, like FIG. 6, shows the relationship between intensity and time, the relationship between frequency and time, and the relationship between intensity and frequency. As shown in FIG. 7, the M-sequence signal or white noise is a signal that evenly includes signals of a wide range of frequency.

The chirp signal, the M-sequence signal or the white noise has a frequency characteristic in which the frequency changes over a wide range. Therefore, by using these signals as inspection sounds, it is possible to obtain echoes in a wide range of frequency in step S102.

Figure 8:
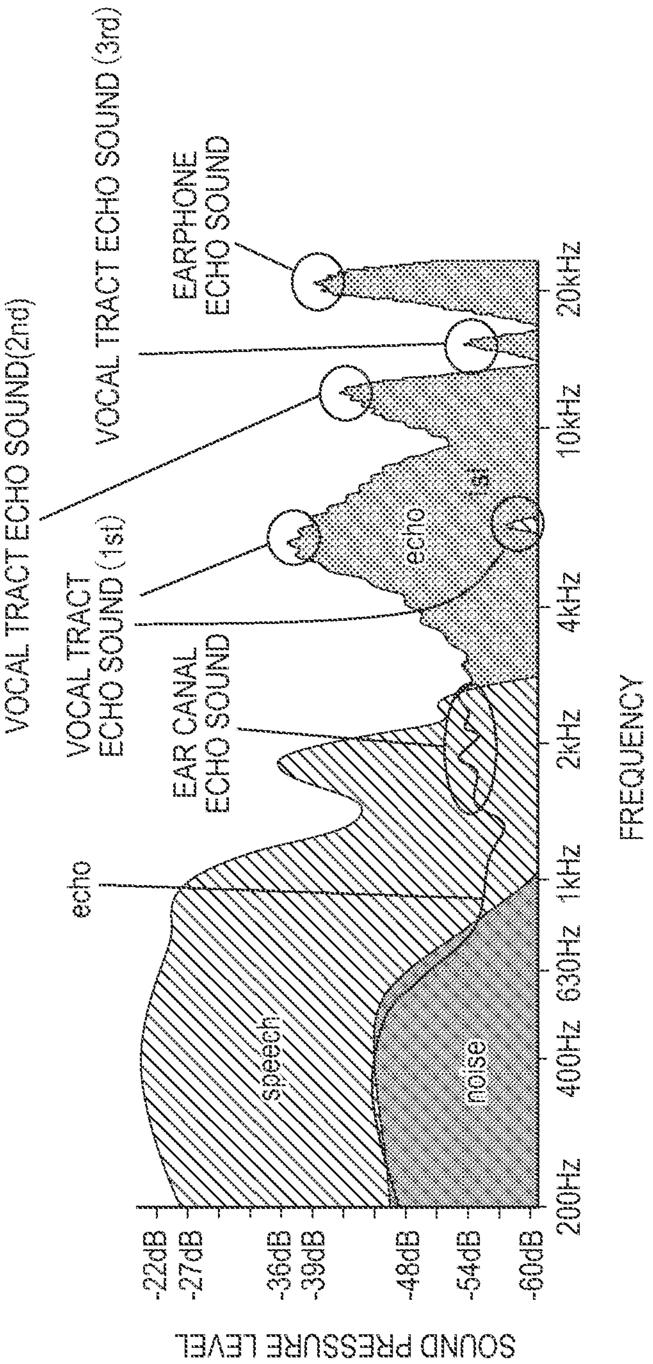
FIG. 8 is a graph showing an example of a characteristic of an echo sound.

A specific example of the echo sound obtained in step S102 will be described. FIG. 8 is a graph showing an example of the characteristics of the echo.

In FIG. 8, the horizontal axis indicates the frequency, and the vertical axis indicates the sound pressure level of the obtained sound wave. In FIG. 8, the obtained sound waves are divided into three categories of "noise", "speech" and "echo" for each cause of generation.

"noise" indicates a biological noise, specifically, a biological sound generated by respiration, heartbeat, muscle movement, or the like of the user 3. As shown in FIG. 8, "noise" is concentrated in a range of 1 kHz or less.

"speech" indicates a sound generated by the utterance of the user 3. As shown in FIG. 8, "speech" is concentrated in a range of 3 kHz or less. There is also a small peak at around 6 kHz. This peak results from echoes in the ear canal.

"echo" indicates a sound generated by the inspection sound reverberating in the body of the user 3 such as the ear canal and the vocal tract. As shown in FIG. 8, "echo" indicates a characteristic having a plurality of peaks. Around 2 kHz, a plurality of peaks due to vocal tract resonance sound exist. In addition, first, second, and third peaks of the ear canal resonance sound exist around 6 kHz, 12 kHz, and 14 kHz, respectively. The peaks resulting from these resonances may be used for wearing determination. Since the peak around 20 kHz is a resonance sound in the housing of the earphone 2 or the like, the peak is not an echo sound in the body of the user 3. However, since the absorptance of the resonance sound is different between the wearing state and the non-wearing state, the level of the peak changes depending on the wearing state. Therefore, a peak around 20 kHz may be used for wearing determination.

The resonance sound will now be described in more detail. Resonance is generally a phenomenon in which a physical system exhibits characteristic behavior when an action applied to the physical system at a specific period. An example of resonance in the case of an acoustic phenomenon is a phenomenon in which a large echo is generated at a specific frequency when sound waves of various frequencies are transmitted to a certain acoustic system. Such echoes are called resonance.

Figure 9:
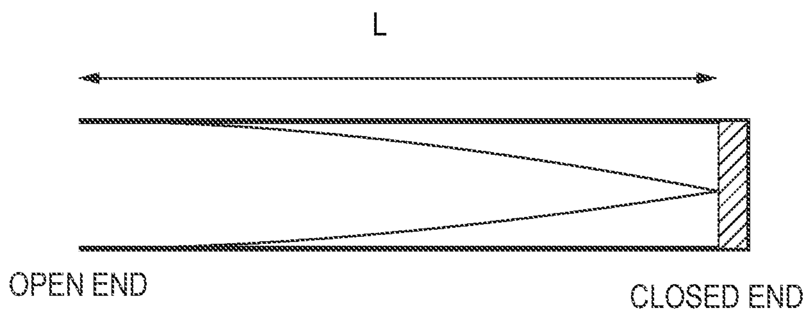
FIG. 9 is a structural diagram of an air column pipe in which one end is open end and the other end is closed end.

As a simple model to explain resonance sound, a model of air column pipe resonance is known. FIG. 9 is a structural diagram of an air column pipe in which one end is open end and the other end is closed end. In the example of FIG. 9, assuming that the length of the air column pipe is L, the sound velocity is V, and the resonance order is n (n=1, 2, . . . ), the resonance frequency f is expressed by the following equation (1). However, in equation (1), the open end correction is ignored.

[Math. 1]

$$f = \frac{2n-1}{4L}V \tag{1}$$

Figure 10:
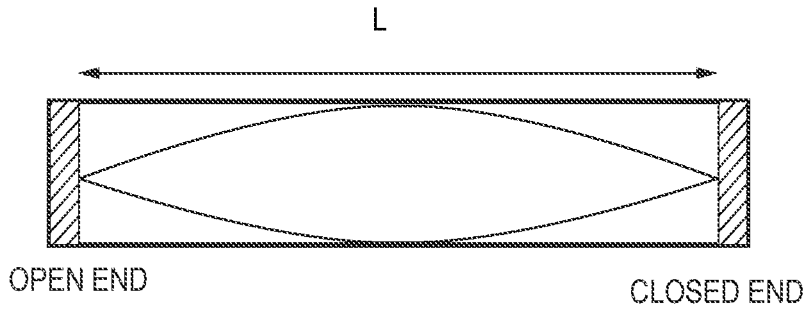
FIG. 10 is a structural diagram of an air column pipe in which both ends are closed end.

FIG. 10 is a structural diagram of an air column pipe in which both ends are closed end. In the example of FIG. 10, the resonance frequency f is expressed by the following equation (2).

[Math. 2]

$$f = \frac{n}{2L}V \quad (2)$$

As can be understood from equations (1) and (2), the higher the observed resonance frequency is, the shorter the air column pipe in which the resonance occurred is, and the lower the observed resonance frequency is, the longer the air column pipe in which the resonance occurred is. That is, the resonance frequency and the length of the portion where the resonance occurs are inversely proportional to each other, and can be correlated with each other.

As a specific example, consider the first order peak observed around 6 kHz in FIG. 8. When the user 3 wears the earphone 2, the structure of the ear canal corresponds to an air column pipe, in which both ends are closed end. Therefore, the length of the air column pipe can be calculated using equation (2). Since the sound velocity V is about 340 m/s, the resonance frequency f is around 6 kHz, and the order n is 1, when these are substituted into equation (2), the value of L is calculated to be about 2.8 cm. Since this length roughly corresponds to the length of the human ear canal, it can be said that the peak seen around 6 kHz in FIG. 8 is certainly due to the ear canal resonance. Cavities in the human body other than ear canal (for example, vocal tract, respiratory tract or the like) can also be described by the air column pipe model, so that resonance frequency can be correlated with the length of the cavities. Thus, the length of the portion where resonance is generated can be specified from the peak included in the characteristic of the echo sound, and the resonance portion can also be specified.

Next, a specific example of the wearing determination in step S103 will be described. FIG. 11 is a table showing the types of acoustic signals and the determination criteria used for the wearing determination. Since the biological sound ("noise" in FIG. 8) is generated in the body of the user 3, it is not detected when the earphone 2 is not worn, or even if it is detected, a very small sound pressure is generated. Therefore, it is possible to perform a wearing determination by an algorithm that when the sound pressure level of the acoustic signal of a predetermined detection frequency of 1 kHz or less is less than a predetermined threshold, it is determined that the device is not worn, and when the sound pressure level is equal to or greater than the threshold, it is determined that the device is worn.

Since the vocal tract echo (around 2 kHz in "echo" in FIG. 8) is also generated in the body of the user 3, it is not detected when the earphone 2 is not worn, or even if it is detected, a very small sound pressure is generated. Therefore, it is possible to perform a wearing determination by an algorithm that when there is no peak or a sufficiently small peak in the sound pressure level of the acoustic signal around 2 kHz, it is determined that the device is not worn, and when there is a peak, it is possible to determine whether the device is worn.

Since the ear canal echo (around 5-20 kHz in "echo" in FIG. 8) is also generated in the body of the user 3, when the earphone 2 is not worn, it is not detected or even if it is detected, a very small sound pressure is generated. Therefore, it is possible to perform a wearing determination by an algorithm that when there is no peak or sufficiently small peak in the sound pressure level of the acoustic signal around 5-20 kHz, it is determined that the device is not worn, and if there is a peak, it is determined that the device is worn.

In addition, since a peak occurred by the vocal tract echo or the ear canal echo may be generated by the biological sound, the peak caused by the biological sound may be used for the wearing determination, but the peak is often weak. Therefore, it is desirable to use an inspection sound or to perform processing for urging the utterance when using the peak of the vocal tract echo or the ear canal echo for the wearing determination. Since the peak of the vocal tract echo becomes larger when the user makes a voice than when the inspection sound is emitted in the ear canal, it is desirable to perform processing to urge the utterance when using the vocal tract echo wearing determination. Since the peak of ear canal echoes is larger when the inspection sound is emitted in the ear canal than when the user makes a voice, it is desirable to perform processing using the inspection sound when it is used for the vocal tract echo wearing determination.

The wearing determination may be performed using any one of those shown in FIG. 11, or may be performed based on whether or not the wearing state score is equal to or greater than a threshold after calculating the wearing state score by parameterizing one or more criteria.

According to the example embodiment, it is possible to acquire acoustic information about resonance in the body of a user 3 wearing a wearable device such as an earphone 2, and determine whether or not the user 3 wears the wearable device based on the acoustic information. Thus, the wearing determination can be performed not only in an environment with external sound but also in a quiet environment without external sound. In addition, since resonance in the body is used for determination, misjudgment in a closed environment is unlikely to occur. Accordingly, it is possible to provide an information processing device capable of performing a wearing determination of a wearable device in a wider environment.

In the example embodiment, when the wearing determination is performed using the inspection sound, it may be determined whether or not the user 3 wears the earphone 2 based on the echo time from the generation of the sound wave from the speaker 26 to the acquisition of the sound wave by the microphone 27. The time from when the inspection sound is emitted toward the ear canal to when the echo sound is obtained is determined by the length of the ear canal because it is the round trip time of the sound wave in the ear canal of the user 3. If the echo time is significantly deviated from the time determined by the length of the ear canal, there is a high possibility that the earphone 2 is not worn. Therefore, by using the echo time as an element of the wearing determination, the wearing determination can be performed with higher accuracy.

Second Example Embodiment

The information processing system of the example embodiment is different from the first example embodiment in the structure of the earphone 2 and the process of the wearing determination. In the following, differences from the first example embodiment will be mainly described, and description of common parts will be omitted or simplified.

Figure 12:
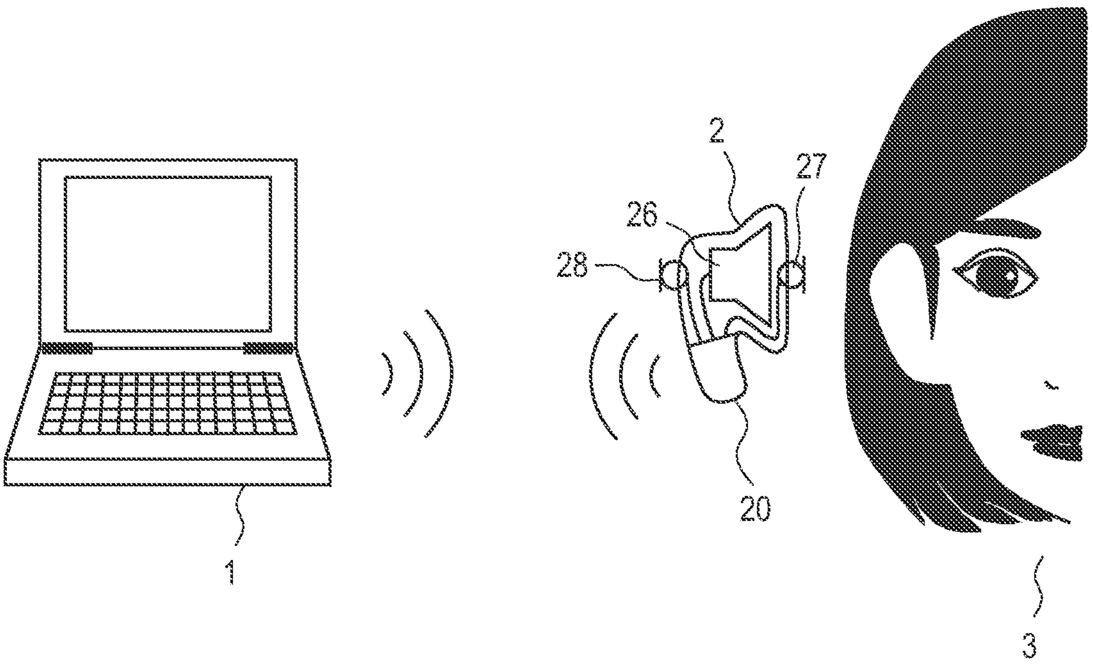
FIG. 12 is a schematic diagram illustrating a general configuration of an information processing system according to a second example embodiment.

FIG. 12 is a schematic diagram illustrating a general configuration of an information processing system according to the example embodiment. In the example embodiment, the earphone 2 includes a plurality of microphones 27 and 28 arranged at different positions. The microphone 28 is controlled by an earphone control device 20. The microphone 28 is arranged on the back side opposite to the wearing surface of the earphone 2 so as to receive sound waves from the outside when the microphone is worn.

The earphone 2 of the example embodiment is more effective in the wearing determination using the biological sound. Since the biological sound is caused by a respiration sound, heartbeat sound, movement of muscles or the like, the sound pressure is weak, and the accuracy of wearing determination using the biological sound may be insufficient due to external noise.

Since biological sounds are generated in the body, they have many components that propagate through the body. Therefore, when the earphone 2 is worn, the biological sound acquired by the microphone 27 becomes larger than the biological sound acquired by the microphone 28. Therefore, when the biological sound acquired by the microphone 27 is larger than the biological sound acquired by the microphone 28, it can be determined to be a wearing state. In this technique, since the influence of the external noise is canceled, it is possible to perform a wearing determination with higher accuracy than in the technique of comparing the magnitude relation with the threshold. Therefore, according to the example embodiment, in addition to obtaining the same effect as that of the first example embodiment, the wearing determination with high accuracy can be realized.

Third Example Embodiment

The information processing system of the example embodiment differs from the first example embodiment in the algorithm of the wearing determination processing in step S103 of FIG. 5. The difference from the first example embodiment is mainly described below, and the description of the common parts will be omitted or simplified.

Figure 13:
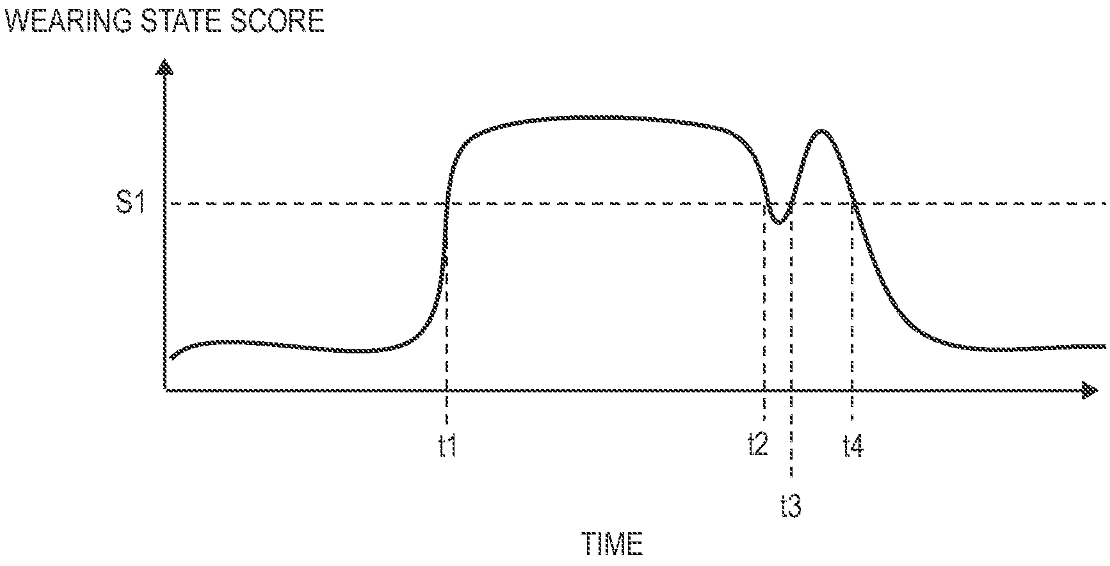
FIG. 13 a graph showing time change of wearing state score according to a third example embodiment.

In the example embodiment, it is assumed that one or more criteria are parameterized to calculate a wearing state score, and wearing determination is performed based on whether the wearing state score is equal to or greater than a threshold. Also, in the processing of FIG. 5, even after the operation is stopped in step S105, the process returns to step S101, and the wearing determination is repeated in a constant period. FIG. 13 is a graph showing an example of the time change of the wearing state score according to the example embodiment. The wearing state score S1 in the figure is a threshold (first threshold) between the wearing state and the non-wearing state.

According to the technique of the first example embodiment, the current state is determined to be the wearing state when the wearing state score is equal to or greater than the first threshold, and the current state is determined to be the non-wearing state when the wearing state score is less than the first threshold. Therefore, it is determined that the period before time t1, the period between time t2 and time t3, and the period after time t4 are in a non-wearing state, and the period between time t1 and time t2 and the period between time t3 and time t4 are in a wearing state.

In this case, the state is also changed when the wearing state score changes in a short time from time t2 to time t3. Since the user 3 does not repeatedly put on and off the earphone 2 in a short period of time, such a change in a short time often does not properly indicate the wearing state. In particular, when it is determined that the earphone 2 is in a non-wearing state in spite of the fact that the earphone 2 is worn, a part of the function of the earphone 2 is stopped, so the convenience for the user 3 is deteriorated. Therefore, in the information processing system of the example embodiment, when the wearing state score changes in a short period of time, the wearing determination processing is performed so as to make the state difficult to change. An example of such a change in a short time is when the user 3 touches the earphone 2. Four examples of wearing determination processing applicable to the example embodiment will be described below.

First Example of Wearing Determination Processing

In a first example of the wearing determination processing according to the example embodiment, when the wearing state score changes from a state equal to or greater than the first threshold to a state less than the first threshold, the wearing state is maintained for a predetermined period. When the wearing state score returns to the first threshold or more within a period in which the wearing state is maintained, it is treated as if the wearing state score does not become the non-wearing state. As a result, when the wearing state score decreases for a short period of time from time t2 to time t3 in FIG. 13, the wearing state is maintained.

Second Example of Wearing Determination Processing

Figure 14:
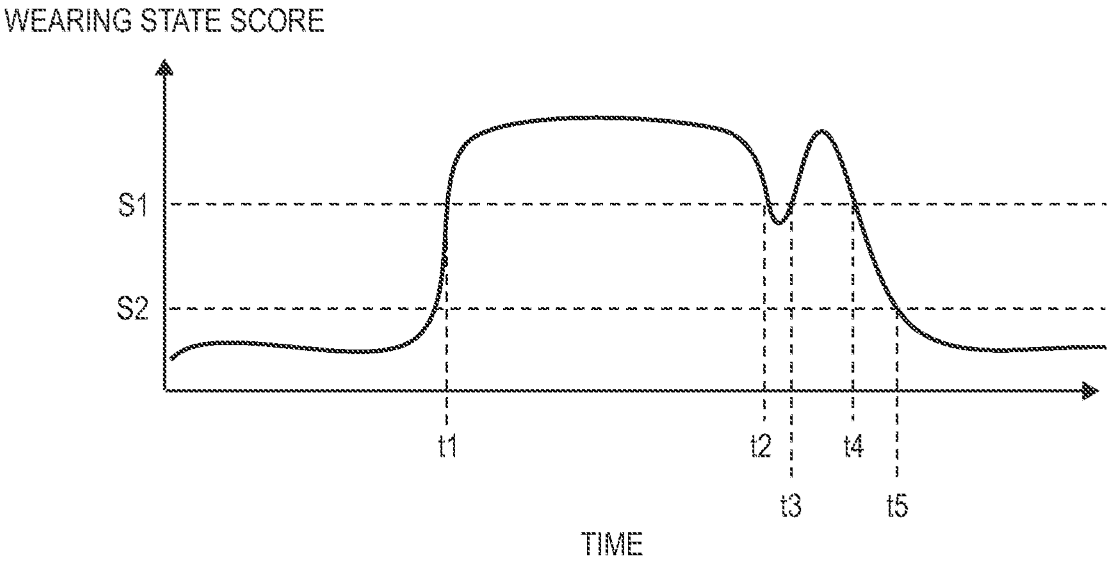
FIG. 14 is a graph showing an example performing a determination of wearing state by two thresholds.

In a second example of the wearing determination processing according to the example embodiment, two thresholds used for wearing determination are provided. FIG. 14 is a graph showing an example of performing a determination of a wearing state by the two thresholds. The wearing state score S1 in FIG. 14 is a first threshold for determining switching from the non-wearing state to the wearing state, and the wearing state score S2 is a second threshold for determining switching from the wearing state to the non-wearing state.

In the example, the wearing state score is lower than the first threshold but not lower than the second threshold during the period from time t2 to time t3, so that the wearing state is maintained. The wearing state is similarly maintained in the period from time t4 to time t5. After time t5, when the wearing state score becomes equal to or less than the second threshold, it is determined to be a non-wearing state. Thus, in the example, by providing two thresholds, hysteresis can be provided for switching from the wearing state to the non-wearing state and switching from the non-wearing state to the wearing state. Therefore, the switching between the wearing state and the non-wearing state due to the minute fluctuation of the wearing state score occurring in a short time is suppressed.

Third Example of Wearing Determination Processing

In a third example of the wearing determination processing according to the example embodiment is such that the period of wearing determination differs according to the wearing state score. More specifically, when the wearing state score is greater than the predetermined value, the period of wearing determination is set to a long time, and when the wearing state score is less than the predetermined value, the period of wearing determination is set to a short time. The predetermined value is set to a value higher than a first threshold used for wearing determination. As a result, when the wearing state score becomes low, as around time t2 or t4 in FIG. 13, the period of the wearing determination becomes long, so that the switching of the state due to the fluctuation of the wearing state score in a short period of time is suppressed. Therefore, if the wearing state score decreases for only a short time such as from time t2 to time t3 in FIG. 13, the wearing state can be easily maintained.

Fourth Example of Wearing Determination Processing

In a fourth example of the wearing determination processing according to the example embodiment is such that the period of wearing determination differs according to the difference between the wearing state score and the first threshold. More specifically, when the difference between the wearing state score and the threshold is greater than the predetermined value, the period of wearing determination is set to a long time, and when the difference between the wearing state score and the first threshold is less than the predetermined value, the period of wearing determination is set to a short time. As a result, when the wearing state score is close to the threshold, as around times t1, t2, t3, and t4 in FIG. 13, the period of the wearing determination becomes long, so that the switching of the state due to the fluctuation of the wearing state score in a short period of time is suppressed. Therefore, if the wearing state score decreases for only a short time such as from time t2 to time t3 in FIG. 13, the wearing state can be easily maintained.

As described above, in the example embodiment, when the wearing state score changes in a short period of time, the wearing determination processing for suppressing the state change is realized. Therefore, the possibility that the convenience for the user 3 is deteriorated such as the earphone 2 being incapable of using due to the determination that the user is not wearing the earphone 2 in spite of wearing is reduced. Therefore, according to the example embodiment, in addition to obtaining the same effect as in the first example embodiment, the convenience of the user can be improved.

The system described in the above example embodiment can also be configured as in the following fourth example embodiment.

Fourth Example Embodiment

Figure 15:
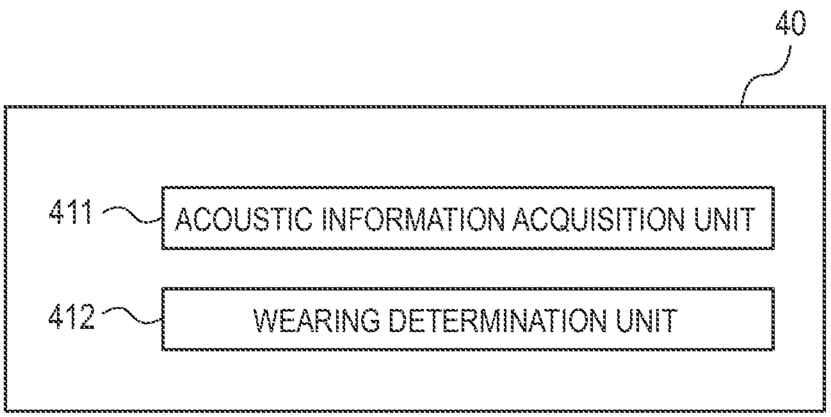
FIG. 15 is a functional block diagram of an information processing device according to a fourth example embodiment.

FIG. 15 is a functional block diagram of the information processing device 40 according to the fourth example embodiment. The information processing device 40 includes an acoustic information acquisition unit 411 and a wearing determination unit 412. The acoustic information acquisition unit 411 acquires acoustic information about resonance in the body of a user wearing a wearable device. The wearing determination unit 412 determines whether or not the user wears the wearable device based on the acoustic information.

According to the example embodiment, there is provided an information processing device 40 capable of performing a wearing determination of a wearable device in a wider range of environments.

Modified Example Embodiments

The disclosure is not limited to the example embodiments described above, and may be suitably modified within the scope of the disclosure. For example, an example in which a part of the configuration of one embodiment is added to another embodiment or an example in which a part of the configuration of another embodiment is replaced is also an example embodiment.

In the above example embodiment, although the earphone 2 is exemplified as an example of a wearable device, the disclosure is not limited to a device worn on the ear as long as acoustic information necessary for processing can be acquired. For example, the wearable device may be a bone conduction type acoustic device.

Further, in the above-described example embodiment, for example, as shown in FIG. 8, the frequency range of the sound used for the wearing determination is within an audible range of 20 kHz or less, but it is not limited to this, and the inspection sound may be a non-audible sound. For example, if the frequency characteristics of the speaker 26 and the microphone 27 are applicable to the ultrasonic band, the inspection sound may be ultrasonic. In this case, discomfort caused by hearing the inspection sound at the time of wearing determination is reduced.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself. Further, one or two or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of software as a service (SaaS).

It should be noted that the above-described embodiments are merely examples of embodying the disclosure, and the technical scope of the disclosure should not be limitedly interpreted by these. That is, the disclosure can be implemented in various forms without departing from the technical idea or the main features thereof.

The whole or part of the example embodiments disclosed above can be described as, but not limited to, the following supplementary notes.

(Supplementary Note 1)

An information processing device comprising:

an acoustic information acquisition unit configured to acquire an acoustic information about a resonance in a body of a user wearing a wearable device; and a wearing determination unit configured to determine whether or not the user wears the wearable device based on the acoustic information.

(Supplementary Note 2)

The information processing device according to supplementary note 1, wherein the acoustic information includes an information about a resonance in a vocal tract of the user.

(Supplementary Note 3)

The information processing device according to supplementary note 2, wherein the wearing determination unit determines whether or not the user wears the wearable device based on a peak of a signal having a frequency corresponding to the resonance in the vocal tract.

(Supplementary Note 4)

The information processing device according to any one of supplementary notes 1 to 3, wherein the acoustic information includes an information about a resonance in an ear canal of the user.

(Supplementary Note 5)

The information processing device according to supplementary note 4, wherein the wearing determination unit determines whether or not the user wears the wearable device based on a peak of a signal having a frequency corresponding to the resonance of the ear canal.

(Supplementary Note 6)

The information processing device according to any one of supplementary notes 1 to 5, wherein the wearable device comprises a sound wave emitting unit configured to emit a sound wave toward an ear canal of the user.

(Supplementary Note 7)

The information processing device according to supplementary note 6 further comprising an emitting sound controlling unit configured to control the sound wave emitting unit to emit a sound wave in a case where a sound pressure level included in the acoustic information is not sufficient for a determination in the wearing determination unit.

(Supplementary Note 8)

The information processing device according to supplementary note 6 or 7, wherein the wearing determination unit determines whether or not the user wears the wearable device based on an echo time between emitting a sound wave from the sound wave emitting unit and acquiring an echo sound in the wearable device.

(Supplementary Note 9)

The information processing device according to supplementary note 8, wherein the echo time is based on a round trip time of a sound wave in the ear canal of the user.

(Supplementary Note 10)

The information processing device according to any one of supplementary notes 6 to 9, wherein a sound wave emitted from the sound wave emitting unit has a frequency characteristic based on a chirp signal, an M-sequence signal or a white noise.

(Supplementary Note 11)

The information processing device according to any one of supplementary notes 1 to 10 further comprising a notification information generation unit configured to generate a notification information to urge the user to emit a voice in a case where a sound pressure level included in the acoustic information is not sufficient for a determination in the wearing determination unit.

(Supplementary Note 12)

The information processing device according to any one of supplementary notes 1 to 11, wherein the wearing determination unit determines whether or not the user wears the wearable device based on a magnitude relation between a score based on the acoustic information and a first threshold.

(Supplementary Note 13)

The information processing device according to supplementary note 12, wherein the wearable device stops at least a part of functions after the score changes from a state where the score is greater than or equal to the first threshold to a state where the score is less than the first threshold.

(Supplementary Note 14)

The information processing device according to supplementary note 13, wherein the wearable device does not stop the at least a part of the functions in a case where the score changes again to be equal to or greater than the first threshold within a predetermined period of time after the score has changed to be less than the first threshold.

(Supplementary Note 15)

The information processing device according to supplementary note 13,

- wherein the wearing determination unit determines whether or not the user wears the wearable device further based on a second threshold less than the first threshold, and
- wherein the wearable device does not stop the at least a part of the functions in a case where, after the score has changed from a state where the score is equal to or greater than the first threshold to a state where the score is less than the first threshold, the score does not change to a state where the score is less than the second threshold.

(Supplementary Note 16)

The information processing device according to any one of supplementary notes 1 to 15, wherein the wearable device is an acoustic device that is worn on an ear of the user.

(Supplementary Note 17)

The information processing device according to any one of supplementary notes 1 to 16, wherein the acoustic information includes an information about a sound generated in the body of the user.

(Supplementary Note 18)

The information processing device according to supplementary note 17, wherein the wearing determination unit determines whether or not the user wears the wearable device based on a sound pressure level corresponding to a sound generated in the body of the user.

(Supplementary Note 19)

The information processing device according to any one of supplementary notes 1 to 18, wherein the wearing determination unit determines whether or not the user wears the wearable device based on the acoustic information acquired by a plurality of microphones arranged in different positions each other.

(Supplementary Note 20)

A wearable device comprising:

- an acoustic information acquisition unit configured to acquire an acoustic information about a resonance in a body of a user wearing the wearable device; and
- a wearing determination unit configured to determine whether or not the user wears the wearable device based on the acoustic information.

(Supplementary Note 21)

An information processing method comprising:

- acquiring an acoustic information about a resonance in a body of a user wearing a wearable device; and
- determining whether or not the user wears the wearable device based on the acoustic information.

(Supplementary Note 22)

A storage medium storing a program that causes a computer to perform:

- acquiring an acoustic information about a resonance in a body of a user wearing a wearable device; and
- determining whether or not the user wears the wearable device based on the acoustic information.

REFERENCE SIGNS LIST

1 information communication device
2 earphone
3 user
20 earphone control device
26 speaker
27, 28 microphone
40 information processing device
101, 201 CPU
102, 202 RAM
103, 203 ROM
104 HDD
105, 207 communication I/F
106 input device
107 output device
204 flash memory
205 speaker I/F
206 microphone I/F
208 battery
211, 411 acoustic information acquisition unit
212, 412 wearing determination unit
213 emitting sound controlling unit
214 notification information generation unit
215 storage unit

The invention claimed is:

1. An information processing device comprising:
a memory configured to store instructions; and
a processor configured to execute the instructions to:
acquire an acoustic information about a resonance in a body of a user wearing a wearable device;
determine whether or not the user wears the wearable device based on a magnitude relation between a score based on the acoustic information and a first threshold;
stop at least a part of functions of the wearable device after the score changes from a state where the score is greater than or equal to the first threshold to a state where the score is less than the first threshold; and
not stop the at least a part of the functions of the wearable device in a case where the score changes again to be equal to or greater than the first threshold within a predetermined period of time after the score has changed to be less than the first threshold.

2. The information processing device according to claim 1, wherein the acoustic information includes an information about a resonance in a vocal tract of the user.

3. The information processing device according to claim 2, wherein whether or not the user wears the wearable device is determined based on a peak of a signal having a frequency corresponding to the resonance in the vocal tract.

4. The information processing device according to claim 1, wherein the acoustic information includes an information about a resonance in an ear canal of the user.

5. The information processing device according to claim 4, wherein whether or not the user wears the wearable device is determined based on a peak of a signal having a frequency corresponding to the resonance of the ear canal.

6. The information processing device according to claim 1, wherein the wearable device comprises a sound wave emitting unit configured to emit a sound wave toward an ear canal of the user.

7. The information processing device according to claim 6, wherein the processor is further configured to execute the instructions to control the sound wave emitting unit to emit a sound wave in a case where a sound pressure level included in the acoustic information is not sufficient for a determination.

8. The information processing device according to claim 6, wherein whether or not the user wears the wearable device is determined based on an echo time between emitting a sound wave from the sound wave emitting unit and acquiring an echo sound in the wearable device.

9. The information processing device according to claim 8, wherein the echo time is based on a round trip time of a sound wave in the ear canal of the user.

10. The information processing device according to claim 6, wherein a sound wave emitted from the sound wave emitting unit has a frequency characteristic based on a chirp signal, an M-sequence signal or a white noise.

11. The information processing device according to claim 1, wherein the processor is further configured to execute the instructions to generate a notification information to urge the user to emit a voice in a case where a sound pressure level included in the acoustic information is not sufficient for a determination.

12. The information processing device according to claim 1, wherein the wearable device is an acoustic device that is worn on an ear of the user.

13. The information processing device according to claim 12, wherein the acoustic information includes an information about a sound generated in the body of the user.

14. The information processing device according to claim 13, wherein whether or not the user wears the wearable device is determined based on a sound pressure level corresponding to a sound generated in the body of the user.

15. The information processing device according to claim 1, wherein whether or not the user wears the wearable device is determined based on the acoustic information acquired by a plurality of microphones arranged in different positions each other.

16. An information processing method comprising:
acquiring an acoustic information about a resonance in a body of a user wearing a wearable device; and
determining whether or not the user wears the wearable device based on a magnitude relation between a score based on the acoustic information and a first threshold;
stop at least a part of functions of the wearable device after the score changes from a state where the score is greater than or equal to the first threshold to a state where the score is less than the first threshold; and
not stop the at least a part of the functions of the wearable device in a case where the score changes again to be equal to or greater than the first threshold within a predetermined period of time after the score has changed to be less than the first threshold.

17. A non-transitory storage medium storing a program that causes a computer to perform:
acquiring an acoustic information about a resonance in a body of a user wearing a wearable device; and
determining whether or not the user wears the wearable device based on a magnitude relation between a score based on the acoustic information and a first threshold;
stop at least a part of functions of the wearable device after the score changes from a state where the score is greater than or equal to the first threshold to a state where the score is less than the first threshold; and
not stop the at least a part of the functions of the wearable device in a case where the score changes again to be equal to or greater than the first threshold within a predetermined period of time after the score has changed to be less than the first threshold.

* * * * *